United States Patent
Michit et al.

(10) Patent No.: US 10,914,896 B2
(45) Date of Patent: Feb. 9, 2021

(54) PHOTONIC INTERCONNECT SWITCHES AND NETWORK INTEGRATED INTO AN OPTOELECTRONIC CHIP

(71) Applicant: STMicroelectronics (Crolles 2) SAS, Crolles (FR)

(72) Inventors: Nicolas Michit, Grenoble (FR); Patrick Le Maitre, Biviers (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 16/199,845

(22) Filed: Nov. 26, 2018

(65) Prior Publication Data

US 2019/0162906 A1 May 30, 2019

(30) Foreign Application Priority Data

Nov. 28, 2017 (FR) .................................. 17 61248

(51) Int. Cl.

| G02B 6/12 | (2006.01) |
|---|---|
| G02B 6/26 | (2006.01) |
| G02B 6/42 | (2006.01) |
| G02B 6/34 | (2006.01) |
| G02B 6/293 | (2006.01) |
| H04Q 11/00 | (2006.01) |
| G02B 6/35 | (2006.01) |

(52) U.S. Cl.
CPC ....... *G02B 6/29343* (2013.01); *G02B 6/3596* (2013.01); *G02B 6/4215* (2013.01); *H04Q 11/0005* (2013.01); *G02B 6/3546* (2013.01); *H04Q 2011/0007* (2013.01)

(58) Field of Classification Search
CPC .............. G02B 6/29343; G02B 6/3596; G02B 6/4215; G02B 6/3546; H04Q 11/0005; H04Q 2011/0007
USPC ............................ 385/14, 30–32, 37, 45–46
See application file for complete search history.

(56) References Cited

U.S. PATENT DOCUMENTS

| 6,411,752 B1 * | 6/2002 | Little ................. G02B 6/12002 385/17 |
|---|---|---|
| 2008/0303894 A1 | 12/2008 | Ernst et al. |
| 2009/0167923 A1 | 7/2009 | Safaee-Rad et al. |
| 2011/0316982 A1 | 12/2011 | Steurer |

(Continued)

FOREIGN PATENT DOCUMENTS

| EP | 1176438 A1 | 1/2002 |
|---|---|---|
| EP | 3080662 | 6/2015 |

OTHER PUBLICATIONS

INPI Search Report and Written Opinion for FR 1761248 dated Jul. 17, 2018 (10 pages).

(Continued)

*Primary Examiner* — Kaveh C Kianni
*Assistant Examiner* — Hung Q Lam
(74) *Attorney, Agent, or Firm* — Crowe & Dunlevy (57) ABSTRACT

An elementary photonic interconnect switch is integrated into an optoelectronic chip and includes four simple photonic interconnect switches. Each simple photonic interconnect switch has two optical waveguides that cross and are linked by a ring resonator having one ring. A basic photonic interconnect switch, a complex photonic interconnect switch and/or a photonic interconnect network are integrated into an optoelectronic chip and including at least two elementary photonic interconnect switches.

5 Claims, 8 Drawing Sheets

(56) References Cited

U.S. PATENT DOCUMENTS

| | | |
|---|---|---|
| 2012/0045167 A1 | 2/2012 | Julien et al. |
| 2012/0148109 A1 | 6/2012 | Kawamura et al. |
| 2012/0200673 A1 | 8/2012 | Tagawa et al. |
| 2012/0251042 A1* | 10/2012 | Julien ............... H04Q 11/0005 385/17 |
| 2012/0288157 A1 | 11/2012 | Kishima |
| 2013/0033579 A1 | 2/2013 | Wajs |
| 2013/0101177 A1 | 4/2013 | Yamada et al. |
| 2013/0307966 A1 | 11/2013 | Komatsu |
| 2014/0118556 A1 | 5/2014 | Huang et al. |
| 2015/0055951 A1 | 2/2015 | Mehrvar et al. |
| 2015/0086127 A1 | 3/2015 | Camilus et al. |
| 2015/0168803 A1* | 6/2015 | Xu ......................... G02F 1/353 359/332 |

OTHER PUBLICATIONS

Shabani, Hesam, et al: "Loss-Aware Switch Design and Non-Blocking Detection Algorithm for Intra-Chip Scale Photonic Interconnection Networks," IEEE Transactions on Computers, vol. 65, No. 6, Jun. 2016, pp. 1789-1801.

Poon, Andrew W., et al: "Cascaded Microresonator-Based Matrix Switch for Silicon On-Chip Optical Interconnection," Proceedings of the IEEE, vol. 97, No. 7, Jul. 2009, pp. 1216-1238.

Sherwood-Droz, Nicolas, et al: Optical 4×4 Hitless Silicon Router for Optical Networks-on-Chip (NoC), Optics Express 15915, vol. 16, No. 20, Sep. 29, 2008 (8 pages).

Bianco, Andrea, et al: "Optical Interconnection Networks Based on Microring Resonators," J. Opt. Commun. Netw/ vol. 4, No. 7, Jul. 2012, pp. 546-556.

Kazmierczak A et al Highly Integrated Optical 4×4 Crossbar in Silicon-On-Insulator Technology Journal of Lightwave Technology, IEEE Service Center, New York, NY, US—vol. 27, No. 16, Aug. 15, 2009 (Aug. 15, 2009)-, pp. 3317-3323, XP011281151, -ISSN: 0733-8724, DOi: 10.1109/JLT .2008.2010462—figures 3,4,9.

Andrzej Kazmi Erczak et al Synthesis of Highly Integrated Optical Network Base on Microdisk-Resonator Add-Drop Filters in Silicon-on-Insulator Technology vol. 48, No. 10—Oct. 1, 2009), p. 104601, XP55474804, -Belli Ngham—ISSN: 0091-3286, DOI: 10.1117/1.3242841—p. 1, colonne 1, al i néa 1; figure 1.

Andrzej Kazmi Erczak et al Optimization of an Integrated Opticla Crossbarin SOI Technology for Optical Networks on Chip Journal of Telecommunications and Informati on Technology, vol. 3, Jan. 1, 2007 (Jan. 1, 2007), pp. 109-114, XP55474836.

Yangjin Ma, Ultralow loss single layer submicron silicon waveguide crossing for SOI optical interconnect, Optic Express, vol. 21, issue 24, 2013.

De Heyn et al., Fabrication Tolerant Four-Channel WDM Filter Based on Collectively Tuned Si Microrings, Journal of Lightwave Technology, vol. 31, No. 16, 2013.

PhoxTrot, "Design of 4×4 on-chip switching matrix", 2012.

* cited by examiner

PHOTONIC INTERCONNECT SWITCHES AND NETWORK INTEGRATED INTO AN OPTOELECTRONIC CHIP

PRIORITY CLAIM

This application claims the priority benefit of French Application for Patent No. 1761248, filed on Nov. 28, 2017, the content of which is hereby incorporated by reference in its entirety to the maximum extent allowable by law.

TECHNICAL FIELD

According to embodiments, the present invention relates to the field of photonic interconnect switches integrated into optoelectronic chips and of photonic interconnect networks integrated into optoelectronic chips and including such switches.

BACKGROUND

It is known in the art to produce linear optical waveguides that are integrated into optoelectronic chips and able to confine and guide light.

It is also known to produce photonic interconnect switches that are integrated into optoelectronic chips, allowing photons to be transferred from one optical waveguide to another optical waveguide via a redirecting ring resonator that is controllable by an electrical signal.

Generally, the resonator comprises an integrated ring and an integrated electronic component adjacent to this ring and controllable with an electrical signal, the integrated ring having sections adjacent to the optical waveguides so as to form zones of optical coupling between the ring and the optical waveguides.

In the absence of an electrical signal, the integrated ring is in what is called a "non-resonant" state such that a light wave, guided to a coupling zone by an optical waveguide, passes through this coupling zone and continues its journey in this optical waveguide.

In contrast, in the presence of an electrical signal, the integrated electronic component modifies the state of the integrated ring, which is then placed in what is called a "resonant" state such that a light wave that reaches a coupling zone via one of the optical waveguides is transferred to the integrated ring then transferred to the other optical waveguide via the other coupling zone, the light wave continuing its journey in the other optical waveguide in an opposite direction.

The structures described above are commonly produced on silicon and silicon-on-insulator (SOI) substrates.

Moreover, the document H. Shabani, "Loss aware switch design and non blocking detection algorithm for intra-chip scale photonic interconnection networks", IEEE Transactions on Computers, Volume: 65, Issue: 6, June, 2016 (incorporated by reference) proposes complex photonic interconnect networks that are integrated into optoelectronic chips and that comprise a plurality of optical waveguides and a plurality of switches such as described above, and that include intersections between the optical waveguides, with a view to selectively transferring, by selectively controlling the resonators, data and packets of data between sources and recipients.

The photonic interconnect networks described by Shabani are limited by losses and crosstalk, which degrade the transmitted signals when the optical waves pass through intersections or resonators. These should therefore be limited as much as possible.

SUMMARY

An elementary photonic interconnect switch integrated into an optoelectronic chip is proposed, which comprises first, second, third and fourth simple switches.

Each simple switch comprises first and second linear optical waveguides that cross to form an intersection and that respectively have first and second ends and third and fourth ends, and comprises a redirecting photonic ring resonator, controllable with an electrical signal, that is provided with a single ring forming an optical waveguide and positioned such that both the ring and the first and second optical waveguides form local optical coupling zones therebetween, which zones are located between both said intersection and said first end of the first optical waveguide and said third end of the second optical waveguide.

The elementary switch comprises the following optical links.

An optical link is provided to link the second end of the first optical waveguide of the first simple switch to the first end of the first optical waveguide of the second simple switch, so that the first optical waveguides of the first and second simple switches are in series.

An optical link is provided to link the fourth end of the second optical waveguide of the first simple switch to the first end of the second optical waveguide of the simple switch, so that the second optical waveguides of the first and third simple switches are in series.

An optical link is provided to link the fourth end of the second optical waveguide of the second simple switch to the third end of the second optical waveguide of the fourth simple switch, so that the second optical waveguides of the second and fourth simple switches are in series.

An optical link is provided to link the second end of the first optical waveguide of the third simple switch to the first end of the first optical waveguide of the fourth simple switch, so that the first optical waveguides of the third and fourth simple switches are in series.

The first and third ends of the first simple switch, the third end of the second simple switch, the first end of the third simple switch, the second and fourth ends of the fourth simple switch, the second end of the second simple switch and the fourth end of the third simple switch respectively form outer input/output ends.

The resonators of said simple switches may be able to resonate at the same frequency.

The optical waveguides and the rings of the resonators may be produced in one and the same plane.

Each simple switch may have an axis of symmetry passing through their intersection and through the center of the ring of their resonator.

The elementary switch may have an axis of symmetry passing through the intersections and the centers of the rings of the resonators of the first and fourth simple switches.

A basic photonic interconnect switch integrated into an optoelectronic chip is also proposed, which comprises first and second elementary switches that are linked in series in the following way.

The basic switch comprises optical links that link the outer ends of the fourth simple switch of the first elementary switch and the outer ends of the first simple switch of the second elementary switch, and optical links that link the outer ends of the second and of the third simple switches of the first elementary switch and the outer ends of the second and of the third simple switches of the second elementary switch.

The resonators of said simple switches of the first and second elementary switches may be able to resonate at the same frequency.

A complex photonic interconnect switch integrated into an optoelectronic chip is also proposed, which comprises an even number of elementary switches, in which the elementary switches are linked in series and in which the elementary switches are subjected pairwise to different frequencies.

A complex photonic interconnect switch integrated into an optoelectronic chip is also proposed, which comprises plurality of basic switches, in which the elementary switches are linked in series and in which the basic switches are subjected to different frequencies.

A photonic interconnect network integrated into an optoelectronic chip is also proposed, which comprises optoelectronic devices respectively having optical wave input ports and output ports, which are selectively linked via at least one basic switch or via at least one complex switch.

BRIEF DESCRIPTION OF THE DRAWINGS

Integrated photonic interconnect switches will now be described by way of exemplary embodiments, which are illustrated by the drawing, in which.

DETAILED DESCRIPTION

Figure 1:
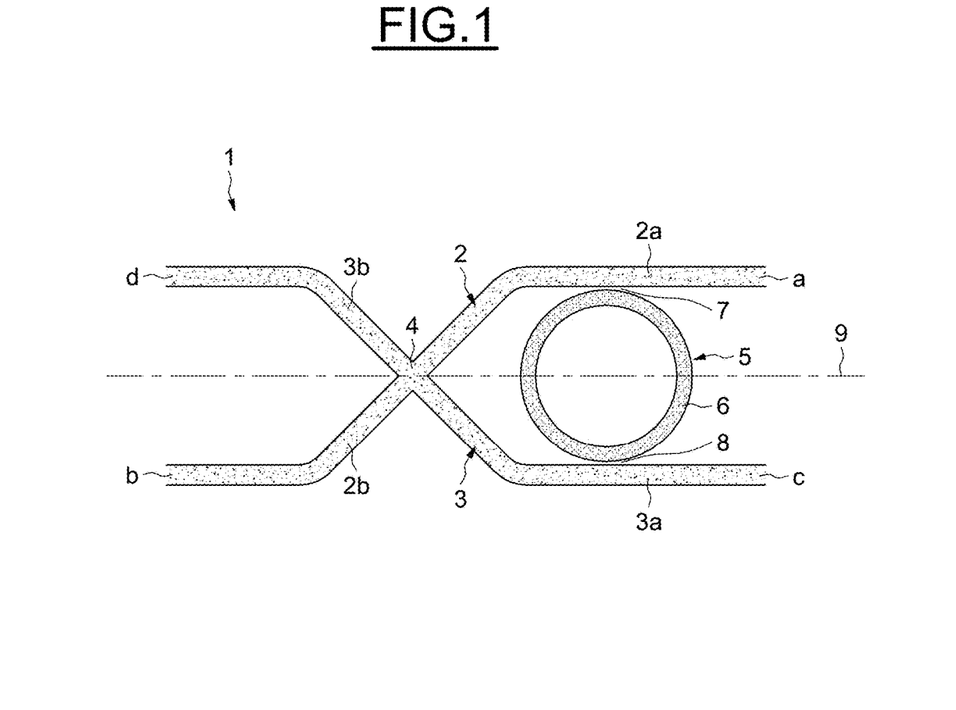
FIG. 1 shows a top view of a simple integrated photonic interconnect switch.

FIG. 1 illustrates a simple photonic interconnect switch 1 integrated into an optoelectronic chip.

The elementary switch 1 comprises, in one and the same plane, first and second linear optical waveguides 2 and 3 that cross to form an intersection 4 and that respectively have first and second ends a and b and third and fourth ends c and d.

The simple switch 1 comprises a redirecting photonic ring resonator 5 that is controllable with an electrical signal.

The redirecting photonic ring resonator 5 comprises a ring 6 forming an optical waveguide. The ring 6 is produced in the same plane as the optical waveguides 2 and 3, between the optical waveguides 2 and 3 and on the side of the ends a and c with respect to the intersection 4.

The ring 6 is adjacent both to the optical waveguide 2, so as to form a first optical coupling zone 7 therebetween, and to the optical waveguide 3, so as to form a local optical coupling zone 8 therebetween, the local optical coupling zones 7 and 8 being located between both the intersection 4 and the first end a of the first optical waveguide 2 and the third end c of the second optical waveguide 3. The local optical coupling zones 7 and 8 form what are called "evanescent" optical couplings.

The ring 6 is associated with integrated components (not shown), which, when they are subjected to an electrical signal, are able to modify the state of the ring resonator 5.

The simple switch 1 advantageously has, for reasons of ease of manufacture, a longitudinal geometric axis of symmetry 9 passing through the intersection 4 and through the center of the ring 6 of the ring resonator 5. In FIG. 1, the geometric axis of symmetry 9 extends from right to left and the ring 6 is on the right with respect to the intersection 4.

In one particular arrangement, which is illustrated in FIG. 1, the optical waveguides 2 and 3 comprise rectilinear sections 2a and 3a that are parallel to the axis of symmetry 9 and between which the ring 6 of the ring resonator 5 is placed, and rectilinear sections 2b and 3b that cross to form the intersection 4 and that are oriented at 45° with respect to the axis of symmetry 9 so as to form a cross.

The simple switch 1 operates in the following way.

In the absence of an electrical signal activating the resonator 5, the ring 6 is in an "OFF" (non-resonant) state. A light wave entering via one of the ends of the optical waveguide 2 exits via the other end of the optical waveguide 2 after having passed through the intersection 4, and a light wave entering via one of the ends of the optical waveguide 3 exits directly via the other end of the optical waveguide 3 after having passed through the intersection 4. These direct modes in which optical waves are routed through the waveguides 2 and 3 may be simultaneous.

In the presence of an electrical signal activating the integrated electronic components associated with the resonator 5, the ring 6 of the resonator 5 is in an "ON" (resonant) state. The following redirections may take place.

A light wave entering via the end a of the optical waveguide 2, when it reaches the coupling zone 7, may be redirected towards the optical waveguide 3 via the ring 6. Next, the light wave is directed towards the end c of the optical waveguide 3.

A light wave entering via the end c of the optical waveguide 3, when it reaches the coupling zone 8, may be redirected towards the optical waveguide 2 via the ring 6. Next, the light wave is directed towards the end a of the optical waveguide 2.

A light wave entering via the end b of the optical waveguide 2, when it reaches the coupling zone 7 after having passed through the intersection 4, is redirected towards the optical waveguide 3 via the ring 6. Next, the light wave is directed towards the end d of the optical waveguide 3 via the intersection 4.

A light wave entering via the end d of the optical waveguide 3, when it reaches the coupling zone 8 after having passed through the intersection 4, is redirected towards the optical waveguide 2 via the ring 6. Next, the light wave is directed towards the end b of the optical waveguide 2 via the intersection 4.

However, if any one of the redirected routing modes described above is activated for an optical wave at a determined frequency, the other redirected routing modes and the direct routing modes are not possible for an optical wave having the same frequency.

Figure 2:
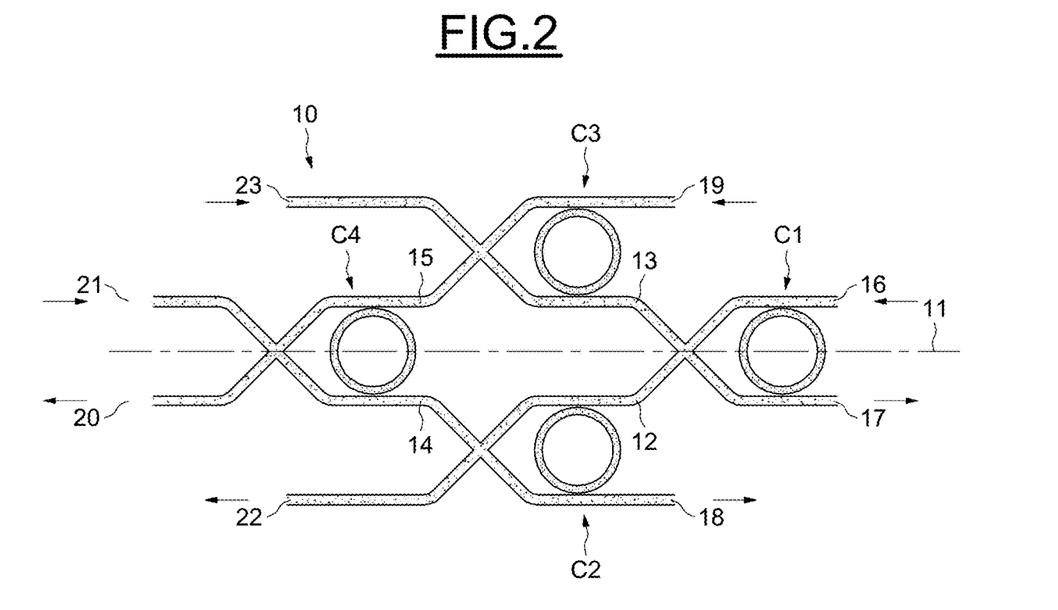
FIG. 2 shows a top view of an elementary integrated photonic interconnect switch.

FIG. 2 illustrates an elementary photonic interconnect switch 10 integrated into an optoelectronic chip, having four inputs and four outputs (4×4).

The elementary photonic interconnect switch 10 comprises a group of four simple switches C1, C2, C3 and C4 that are each equivalent to the simple switch 1 described with reference to FIG. 1 and that are connected in the following way.

The simple switches C1, C2, C3 and C4 are advantageously placed and linked in the following way.

The simple switches C1, C2, C3 and C4 are placed symmetrically with respect to an axis of symmetry 11, being placed in the zones of the corners of a rhombus. In FIG. 2, the axis of symmetry 11 goes from right to left. The switches C1 and C4 are on the right and on the left and their axes of symmetry are merged with the axis of symmetry 11. The switches C2 and C3 are at a distance and symmetric with respect to the axis of symmetry 11, their axes of symmetry being parallel to the axis of symmetry 11. The switches C2 and C3 are at the top and at the bottom.

Optical links, taking the form of sections of optical waveguides, are formed in the following way.

An optical link 12 is provided to link the end b of the first optical waveguide of the switch C1 to the end a of the first optical waveguide of the switch C2, so that the first optical waveguides of switches C1 and C2 are in series.

An optical link 13 is provided to link the end d of the second optical waveguide of the switch C1 to the end c of the second optical waveguide of the switch C3, so that the second optical waveguides of switches C1 and C3 are in series.

An optical link 14 is provided to link the end d of the second optical waveguide of the switch C2 to the end c of the second optical waveguide of the switch C4, so that the second optical waveguides of switches C2 and C4 are in series.

An optical link 15 is provided to link the end b of the first optical waveguide of the switch C3 to the end a of the first optical waveguide of the switch C4, so that the first optical waveguides of switches C3 and C4 are in series.

The elementary switch 1 has optical wave inputs/outputs that are formed in the following way.

As illustrated on the right in FIG. 1, the ends a and c of the switch C1 form outer input/output ends 16 and 17, the end c of the switch C2 forms an outer input/output end 18 and the end a of the switch C3 forms an outer input/output end 19.

As illustrated on the left in FIG. 1, the ends b and d of the switch C4 form outer input/output ends 20 and 21, the end b of the switch C2 forms an outer input/output end 22 and the end d of the switch C3 forms an outer input/output end 23.

The elementary switch 10 operates in the following way.

In general, in the absence of an electrical signal activating the ring resonators 5 of the simple switches C1, C2, C3 and C4, the rings 6 are in an "OFF" (non-resonant) state. A light wave entering via one of the ends of the optical waveguides in series is routed directly and exits via the other end.

Again in general, in the presence of an electrical signal activating said integrated electronic components associated with one of the resonators 5 of the simple switches C1, C2, C3 and C4, the corresponding ring 6 is in an "ON" (resonant) state. A light wave entering via an end of one of the optical waveguides adjacent to this ring is redirected towards the other optical waveguide adjacent to this ring, via this ring.

However, it is accepted that respectively in optical waveguides, a wave may travel only in one direction.

Therefore, the following configuration may be accepted, with a view to forming an elementary switch 10 having four inputs and four outputs (4×4).

The ends 16, 19, 21 and 23 form inputs via which light waves enter the elementary switch 10.

The ends 17, 18, 20 and 22 form outputs via which light waves exit the elementary switch 10.

The above inputs and outputs are symbolically represented in FIG. 2 by corresponding incoming and outgoing arrows.

One alternative mode of operation of the elementary switch 10 may be as follows.

If the ring resonator of the simple switch C3 is activated, a light wave entering via the end 19 is diverted by this ring resonator and is routed to the output end 17.

A light wave may be routed directly from the input end 21 to the output end 18.

However, if a light wave entered via the input 23, it could not be routed towards an output 20 since the output 17 is already occupied and the resonator of the simple switch C3 is occupied.

Other equivalent alternatives may be devised by activating the resonators of the other simple switches.

As a result of the above, the elementary switch 10 is said to be "blocking".

In the case in which the ring resonators of the simple switches C1, C2, C3 and C4 are able to resonate at a frequency k, the elementary switch 10 is able to direct or to redirect light waves set at this frequency. However, any optical waves set at frequencies different from the frequency are routed directly from the input ends to the output ends of the elementary switch 10.

Figure 3:
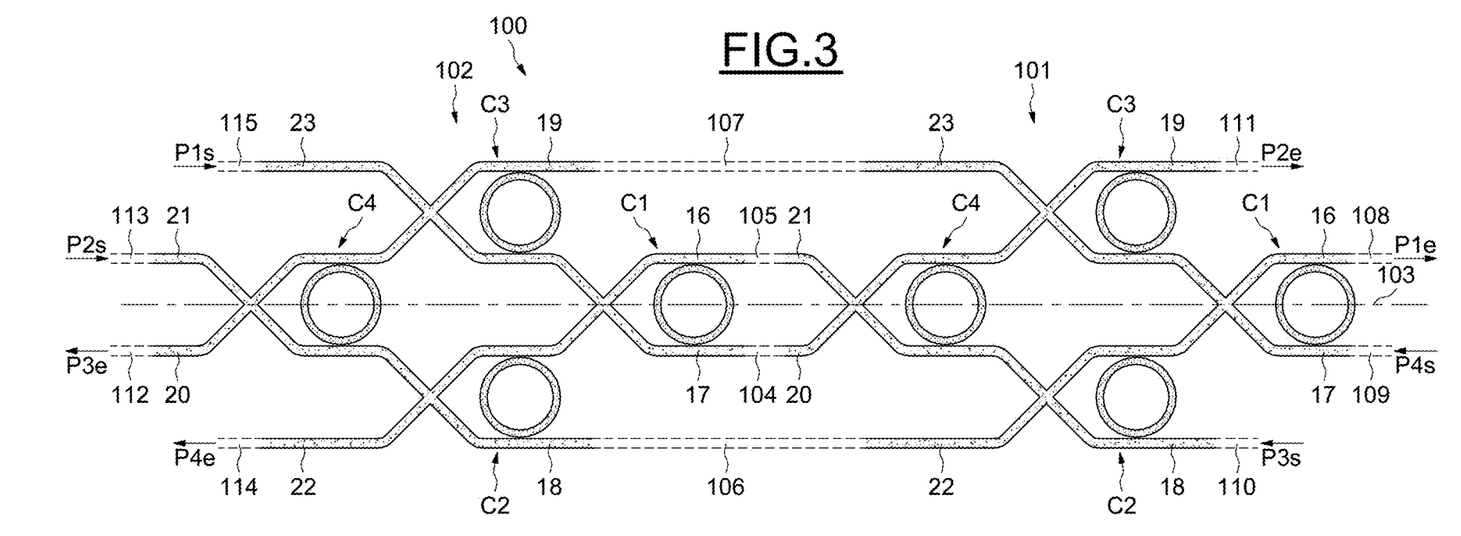
FIG. 3 shows a top view of a basic integrated photonic interconnect switch.

FIG. 3 illustrates a basic switch 100, having four inputs and four outputs (4×4), which comprises two elementary switches 101 and 102, which are each equivalent to the elementary switch 10 described with reference to FIG. 2 and which are linked in series, thus forming two groups of simple switches C1, C2, C3 and C4.

It is specified that the expression "in series" means that the waveguides of one elementary switch are selectively linked to the waveguides of the other elementary switch according to specific coupling modes. It is specified that the word "selectively" means that any one of the waveguides of an elementary switch may be linked to any one of the waveguides of the other elementary switch.

As illustrated in FIG. 3, the coupling modes of the elementary switches 101 and 102 are set up as follows.

The elementary switches 101 and 102 are on the right and on the left in FIG. 3 and are placed along a common axis of symmetry 103, moving from right to left in FIG. 3, with which the axis of symmetry of each of the elementary switches 101 and 102 is merged.

The elementary switches 101 and 102 are linked in series by optical links that are produced in the following way.

An optical link 104 is provided to link the input/output end 20 of the elementary switch 101 to the input/output end 17 of the elementary switch 102.

An optical link 105 is provided to link the input/output end 21 of the elementary switch 101 to the input/output end 16 of the elementary switch 102.

An optical link 106 is provided to link the input/output end 22 of the elementary switch 101 to the input/output end 18 of the elementary switch 102.

An optical link 107 is provided to link the input/output end 23 of the elementary switch 101 to the input/output end 19 of the elementary switch 102.

Thus, the optical links 104 and 105 are provided to link the outer ends 20 and 21 of the fourth simple switch C4 of the first elementary switch 101 and the outer ends 17 and 16 of the first simple switch C1 of the second elementary switch 102. The optical links 106 and 107 are provided to link the outer ends 22 and 23 of the second and of the third simple switches C2 and C3 of the first elementary switch 101 and the outer ends 18 and 19 of the second and of the third simple switches C2 and C3 of the second elementary switch 102.

The basic switch 100 has outer optical wave input/output ends that are formed in the following way.

As illustrated on the right in FIG. 3, the input/output ends 16, 17, 18 and 19 of the elementary switch 101 form outer input/output ends 108, 109, 110 and 111 of the basic switch 100.

As illustrated on the left in FIG. 3, the input/output ends 20, 21, 22 and 23 of the elementary switch 102 form outer input/output ends 112, 113, 114 and 115 of the basic switch 100.

Figure 4:
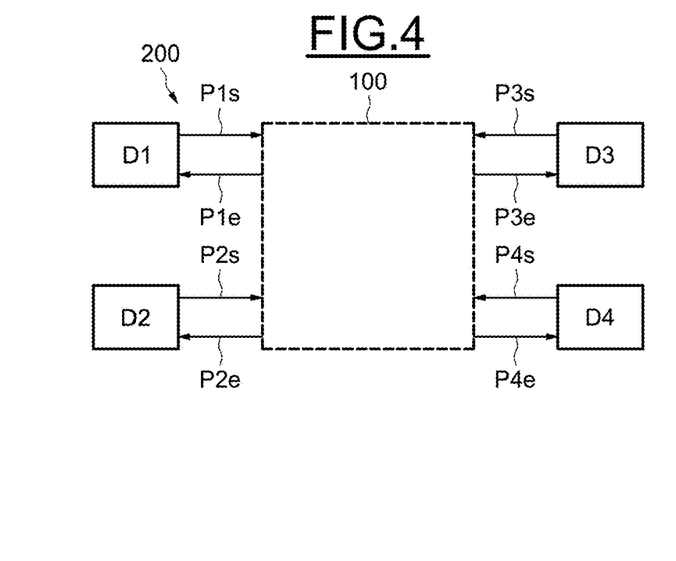
FIG. 4 shows a view of a photonic interconnect network.

FIG. 4 illustrates a photonic interconnect network 200 integrated into an optoelectronic chip, which comprises optoelectronic devices D1, D2, D3 and D4 respectively having optical wave input ports P1e, P2e, P3e and P4e and output ports P1s, P2s, P3s and P4s, which are selectively linked via the basic switch 100 of FIG. 3.

The basic switch 100 is then linked to the optoelectronic devices D1, D2, D3 and D4 in the following way.

As illustrated in FIG. 3, the ends 108, 109, 110, 111 (on the right in FIG. 3) of the basic switch 100, coinciding with the ends 16, 17, 18 and 19 of the elementary switch 101, are respectively linked to the ports P1e, P4s, P3s and P2e, and the ends 112, 113, 114 and 115 (on the left in FIG. 3) of the basic switch 100, coinciding with the ends 20, 21, 22 and 23 of the elementary switch 102, are respectively linked to ports P3e, P2s, P4e and P1s.

It is considered, as an operating condition, that each of the devices D1 to D4 may, at a given instant in time, receive light waves originating from only one device other than itself.

It is accepted that the ring resonators 5 of the simple switches C1, C2, C3 and C4 of the elementary switches 101 and 102 of the basic switch 200 are able, when they are activated, to direct or to redirect light waves set at one and the same frequency λ.

Routing modes or optical paths described below as examples with reference to FIGS. 4A to 4E may then be produced by selectively activating the ring resonators 5 of the simple switches C1, C2, C3 and C4 of the elementary switches 101 and 102 of the basic switch 200 of FIG. 3.

Figure 4A:
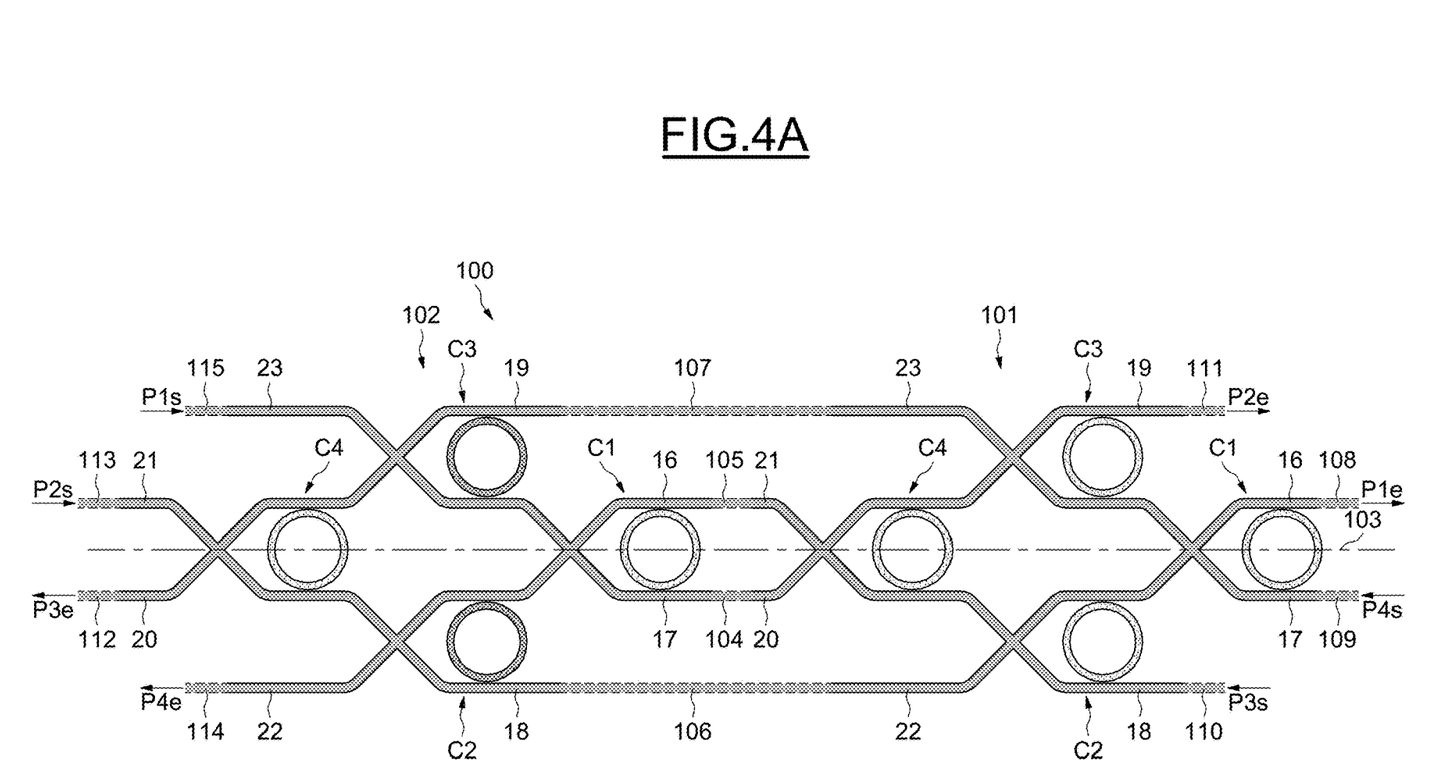
FIGS. 4A to 4E show modes in which optical waves may be routed through the basic switch of FIG. 3.

As illustrated in FIG. 4A, the ring resonators 5 of the simple switches C1, C2, C3 and C4 of the elementary switches 101 and 102 of the basic switch 200 are not activated.

Light waves exiting via the output ports P1s, P2s, P3s and P4s are then routed directly towards, respectively, the input ports P2e, P1e, P4e and P3e, via the corresponding waveguides in series of the elementary switches 101 and 102, which are linked by, respectively, the links 104, 106, 105, and 107, and enter the corresponding outer ends of the basic switch 100.

Figure 4B:
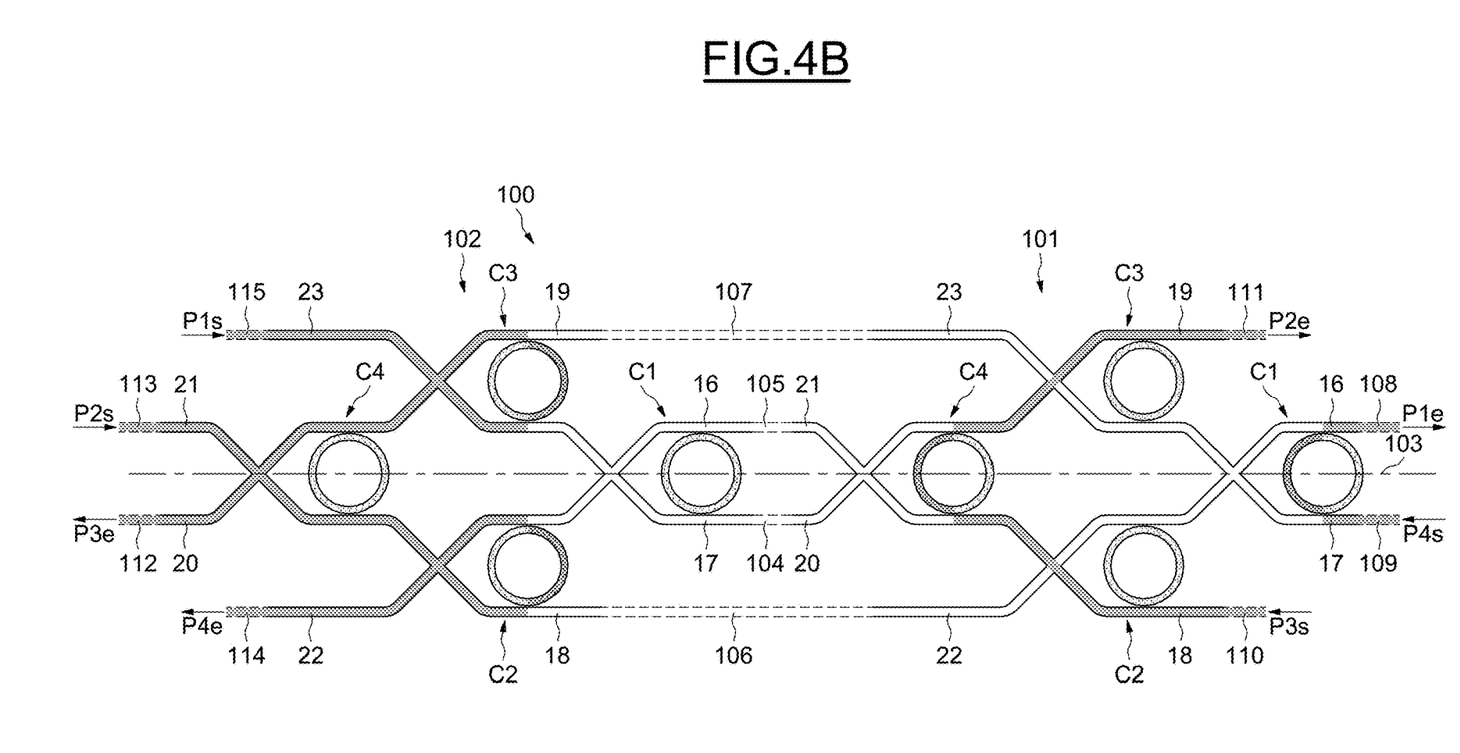

As illustrated in FIG. 4B, the ring resonators of the simple switches C1 and C4 of the elementary switch 101 and the ring resonators C2 and C3 of the elementary switch 102 are activated. The modes in which light waves are routed are then as follows.

A light wave exiting via the output port P4s is redirected by the simple switch C1 of the elementary switch 101 towards the input port P1e, between the corresponding outer ends 109 and 108 of the basic switch 100.

A light wave exiting via the output port P3s is redirected by the simple switch C4 of the elementary switch 101 towards the input port P2e, between the corresponding outer ends 110 and 111 of the basic switch 100.

A light wave exiting via the output port P1s is redirected by the simple switch C3 of the elementary switch 102 towards the input port P3e, between the corresponding outer ends 115 and 112 of the basic switch 100.

A light wave exiting via the output port P2s is redirected by the simple switch C2 of the elementary switch 102 towards the input port P4e, between the corresponding outer ends 113 and 114 of the basic switch 100.

Figure 4C:
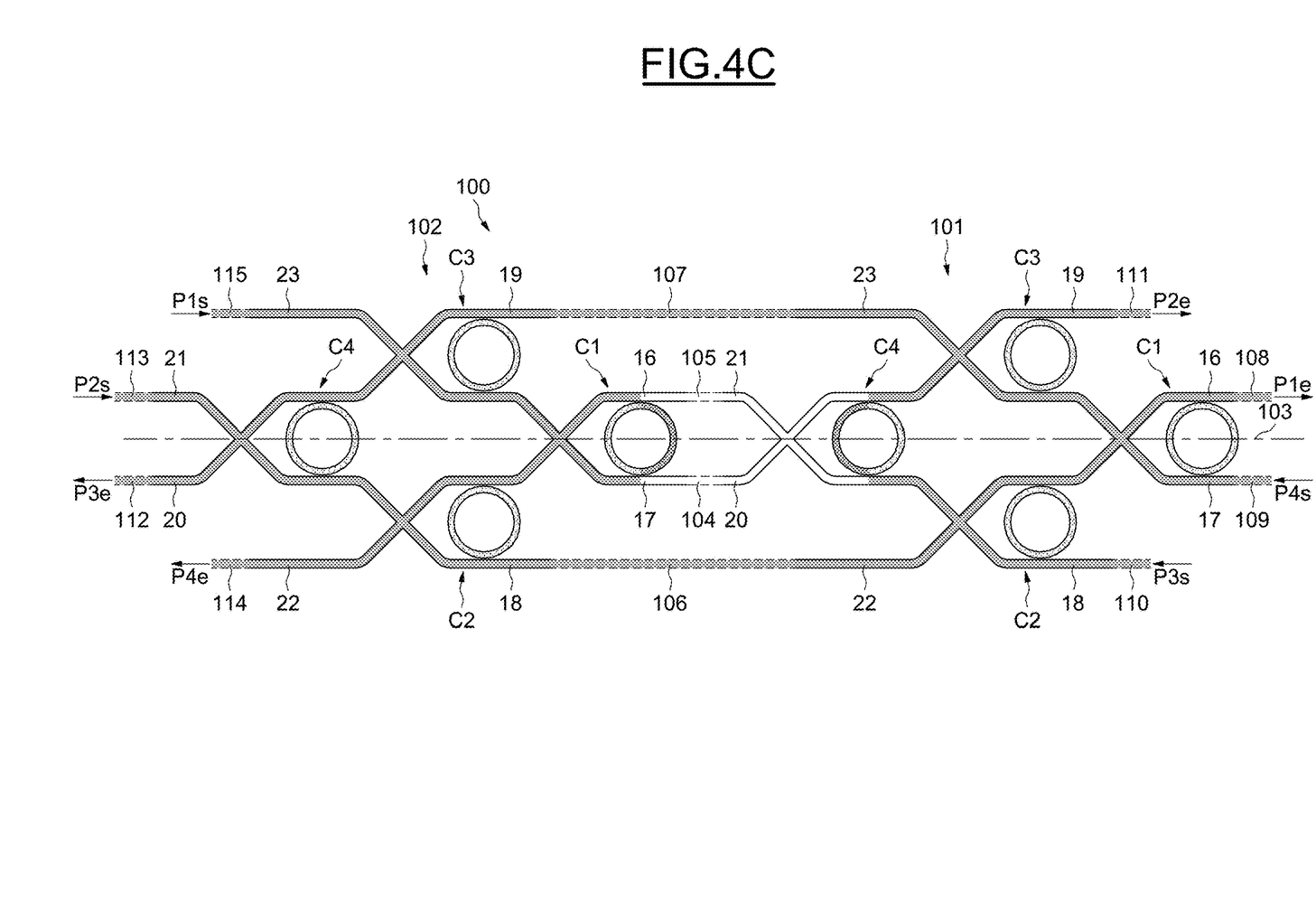

As illustrated in FIG. 4C, the ring resonator of the simple switches C4 of the elementary switch 101 and the ring resonator C1 of the elementary switch 102 are activated. The modes in which light waves are routed are then as follows.

A light wave exiting via the output port P3s is redirected by the simple switch C4 of the elementary switch 101 towards the input port P2e, between the corresponding outer ends 110 and 111 of the basic switch 100.

A light wave exiting via the output port P1s is redirected by the simple switch C1 of the elementary switch 102 towards the input port P4e, between the corresponding outer ends 115 and 114 of the basic switch 100.

A light wave exiting via the output port P4s is routed directly towards the input port P3e, between the corresponding outer ends 109 and 112 of the basic switch 100.

A light wave exiting via the output port P2s is routed directly towards the input port P1e, between the corresponding outer ends 113 and 108 of the basic switch 100.

Figure 4D:
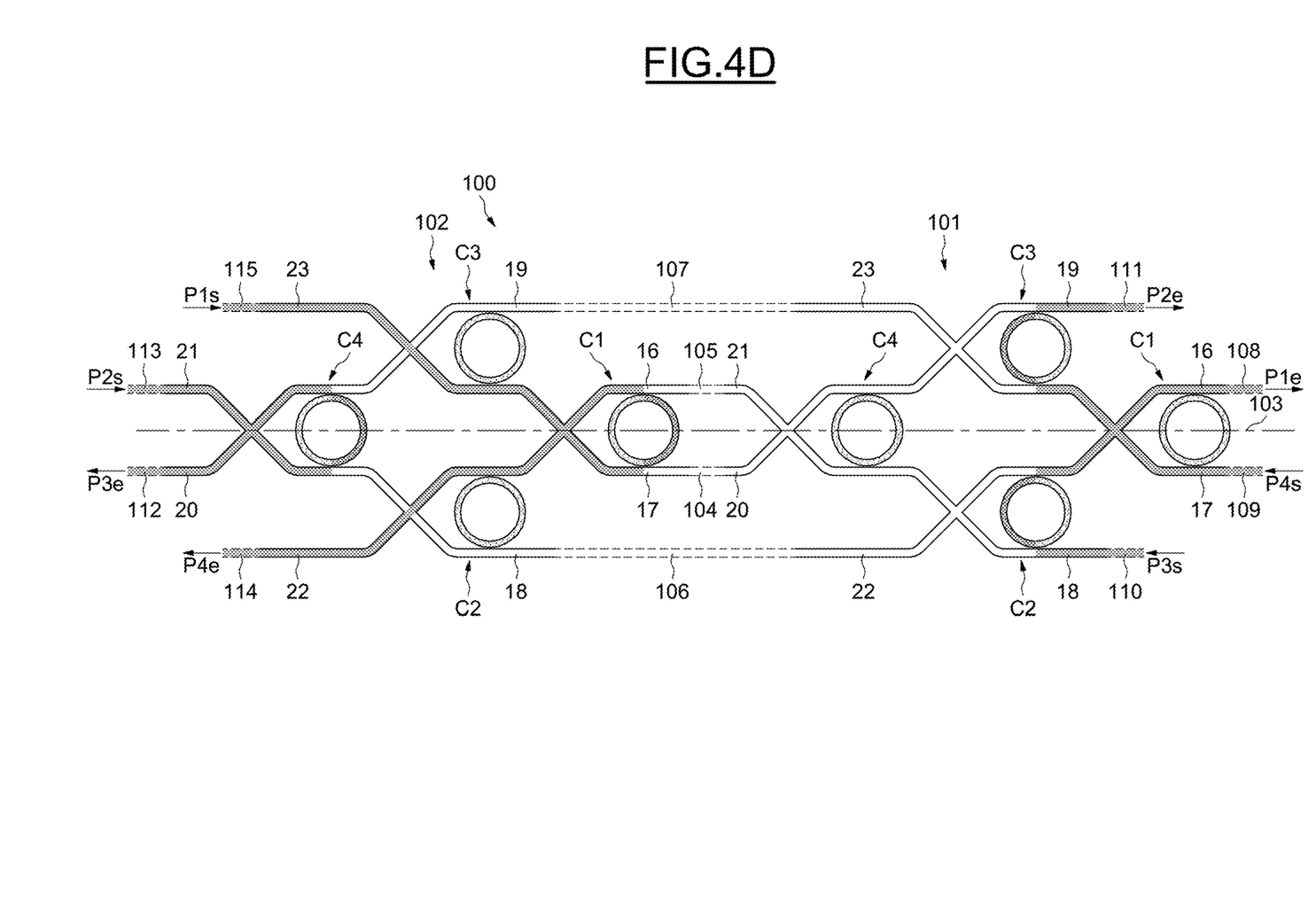

As illustrated in FIG. 4D, the ring resonators of the simple switches C2 and C3 of the elementary switch 101 and the ring resonators C1 and C4 of the elementary switch 102 are activated. The modes in which light waves are routed are then as follows.

A light wave exiting via the output port P4s is redirected by the simple switch C1 of the elementary switch 101 towards the input port P2e, between the corresponding outer ends 109 and 111 of the basic switch 100.

A light wave exiting via the output port P3s is redirected by the simple switch C2 of the elementary switch 101 towards the input port P1e, between the corresponding outer ends 110 and 108 of the basic switch 100.

A light wave exiting via the output port P1s is redirected by the simple switch C1 of the elementary switch 102 towards the input port P4e, between the corresponding outer ends 115 and 114 of the basic switch 100.

A light wave exiting via the output port P2s is redirected by the simple switch C4 of the elementary switch 102 towards the input port P3e, between the corresponding outer ends 113 and 114 of the basic switch 100.

Figure 4E:
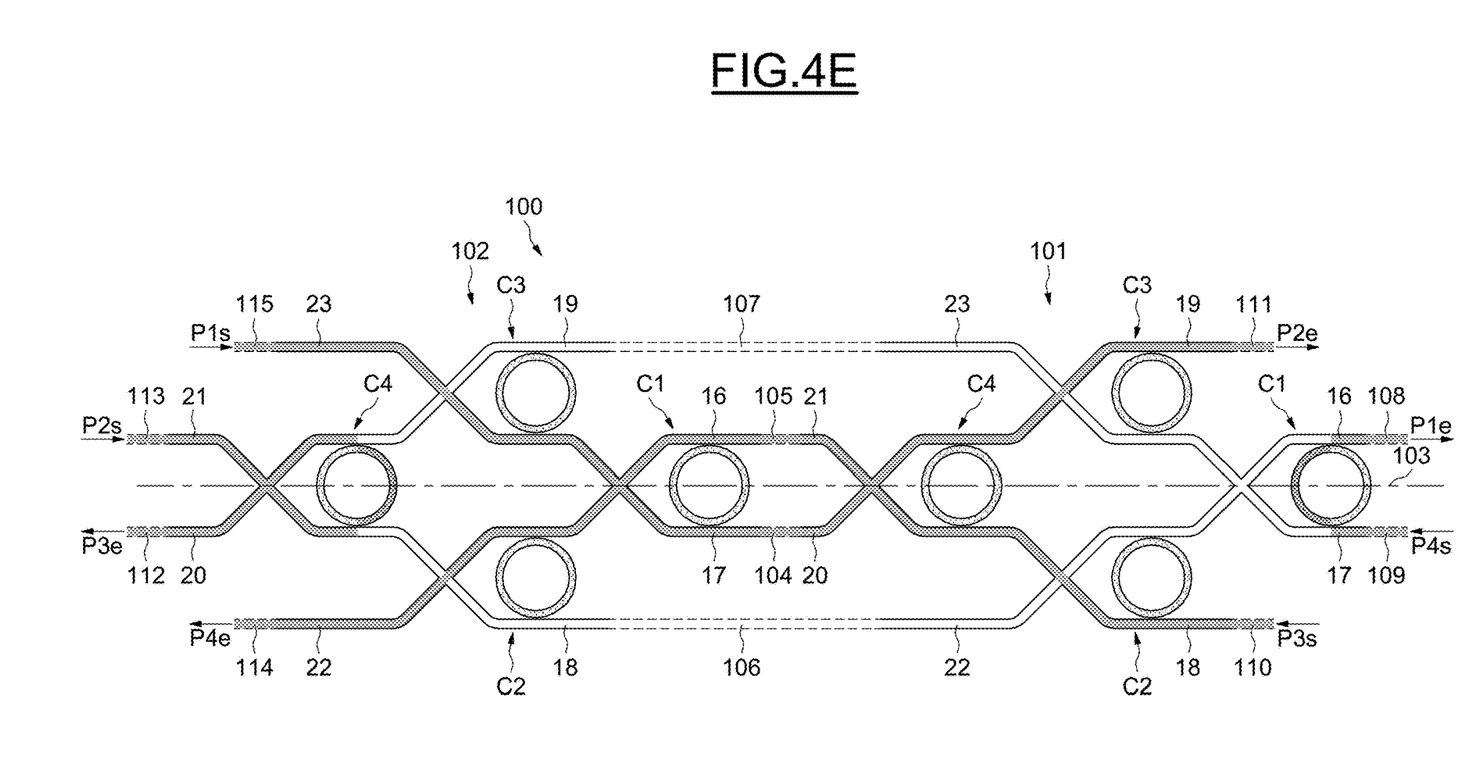

As illustrated in FIG. 4E, the ring resonator of the simple switch C1 of the elementary switch 101 and the ring resonator C4 of the elementary switch 102 are activated. The modes in which light waves are routed are then as follows.

A light wave exiting via the output port P4s is redirected by the simple switch C1 of the elementary switch 101 towards the input port P1e, between the corresponding outer ends 109 and 108 of the basic switch 100.

A light wave exiting via the output port P2s is redirected by the simple switch C4 of the elementary switch 102 towards the input port P3e, between the corresponding outer ends 113 and 112 of the basic switch 100.

A light wave exiting via the output port P1s is routed directly towards the input port P2e, between the corresponding outer ends 115 and 111 of the basic switch 100.

A light wave exiting via the output port P3s is routed directly towards the input port P4e, between the corresponding outer ends 110 and 114 of the basic switch 100.

Other routing modes or optical paths may be envisaged.

As a result of the above, the devices D1 to D4 may, selectively, exchange light waves via the basic switch 100, without blocking, since any device may freely transmit information towards any other device while simply observing the fact that a device can only receive (or transmit) signals from (or to) one other device at a time. Thus, the basic switch 100, composed of the two elementary switches 101 and 102 linked in series, is said to be "non-blocking".

Figure 5:
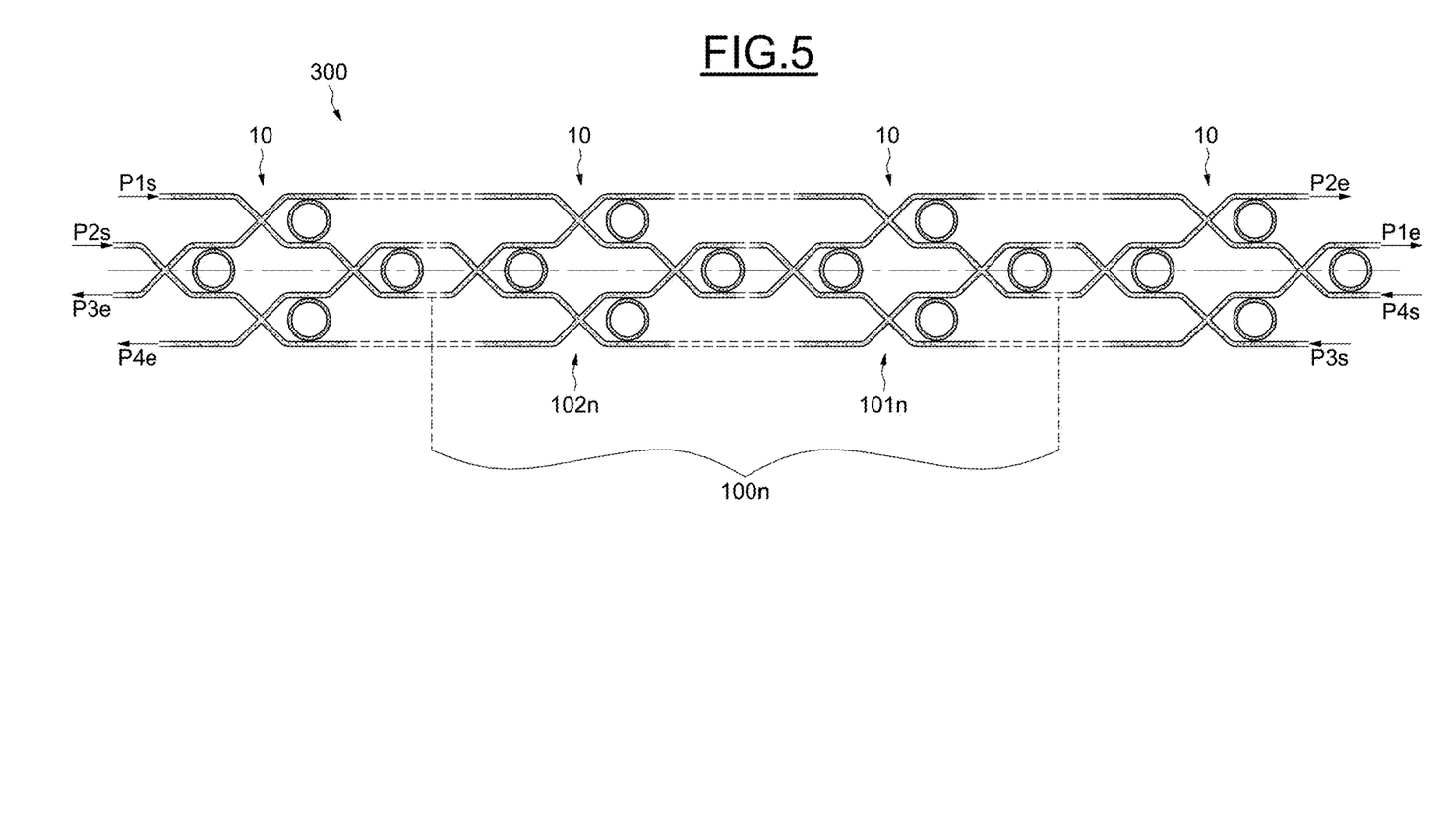
FIG. 5 shows a top view of a complex integrated photonic interconnect switch.

FIG. 5 illustrates a complex switch 300, having four inputs and four outputs (4×4), that is able to direct or to redirect light waves set at different frequencies λn between the devices D1 to D4

The complex switch 200 comprises a plurality of elementary switches, which are equivalent to the elementary switch 10 described above with reference to FIG. 2, which are linked successively in series in the same way as the links between the switches 101 and 102 described above with reference to FIG. 3. The number of elementary switches is equal to twice the number of light wave frequencies to be directed and redirected.

The outer ends of the end elementary switches of the plurality of elementary switches are linked to the ports of the optoelectronic devices D1 to D4 in the same way as that which has been described above with reference to FIG. 3.

A plurality of basic switches 100n is assembled, which basic switches are equivalent to the basic switch 100 described with reference to FIG. 3 and linked in series, subjecting the ring resonators 5 of different pairs of elementary switches 101n and 102n, respectively, to the light wave frequencies to be directed and redirected, without it being necessary for the elementary switches of each pair to be adjacent. The number of basic switches 100n assembled is equal to the number of light wave frequencies to be directed and redirected.

The complex switch operates in the following way.

Each basic switch 100n is able to direct and to redirect the light waves at the frequency λn that is assigned to the ring resonators 5 of the elementary switches 101n and 102n of which it is composed, in the same way as that which has been described above with reference to FIGS. 4A to 4E, while these light waves flow directly through the elementary switches of the other basic switches, in the same way as that which has been described above with reference to FIG. 4A, due to the elementary switches of the other basic switches allowing the light waves at this frequency λn to flow directly therethrough.

The basic switches and the complex switches have been described and represented in the figures by placing the elementary switches in line. Nevertheless, for the needs of chip layout, the elementary switches could be non-aligned so as to form coils, for example.

As is apparent from the above, the described basic switches and the described complex switches are non-blocking, while they contain elementary switches that are very simple but blocking. Thanks to this, the number of intersections of the optical waveguides and the number of ring resonators are decreased so that losses and crosstalk are decreased.

The invention claimed is:

1. A photonic circuit, comprising:
a first elementary photonic interconnect switch and a second elementary photonic interconnect switch linked in series, wherein each elementary photonic interconnect switch comprises:
a first simple switch, a second simple switch, a third simple switch and a fourth simple switch, wherein each simple switch comprises:
first and second optical waveguides that cross to form an intersection and that respectively have first and second ends and third and fourth ends; and
a redirecting photonic ring resonator, controllable with an electrical signal, that is provided with a ring forming an optical waveguide and positioned such that both the ring and the first and second optical waveguides form local optical coupling zones therebetween, which local optical coupling zones are located between both said intersection and said first end of the first optical waveguide and said third end of the second optical waveguide;
wherein a first axis of symmetry passes through a location of the intersection and a center of the ring;
wherein the first axes of symmetry for the first, second, third and fourth simple switches are parallel to a second axis of symmetry for the elementary photonic interconnect switch;
a first optical link extending parallel to the second axis of symmetry that links the second end of the first optical waveguide of the first simple switch to the first end of the first optical waveguide of the second simple switch, so that the first optical waveguides of the first and second simple switches are in series;
a second optical link extending parallel to the second axis of symmetry that links the fourth end of the second optical waveguide of the first simple switch to the third first end of the second optical waveguide of the third simple switch, so that the second optical waveguides of the first and third simple switches are in series;
a third optical link extending parallel to the second axis of symmetry that links the fourth end of the second optical waveguide of the second simple switch to the third end of the second optical waveguide of the fourth simple switch, so that the second optical waveguides of the second and fourth simple switches are in series; and
a fourth optical link extending parallel to the second axis of symmetry that links the second end of the first optical waveguide of the third simple switch to the first end of the first optical waveguide of the fourth simple switch, so that the first optical waveguides of the third and fourth simple switches are in series;
wherein the first and third ends of the first simple switch, the third end of the second simple switch, the first end of the third simple switch, the second and fourth ends of the fourth simple switch, the second end of the second simple switch and the fourth end of the third simple switch respectively form outer input/output ends;
optical links that link the outer ends of the fourth simple switch of the first elementary photonic interconnect switch and the outer ends of the first simple switch of the second elementary photonic interconnect switch; and
optical links that link the outer ends of the second and third simple switches of the first elementary photonic interconnect switch and the outer ends of the second and third simple switches of the second elementary photonic interconnect switch.

2. The photonic circuit according to claim 1, wherein the resonators of said simple switches of the first and second elementary switches operate to resonate at a same frequency.

3. The photonic circuit according to claim 1, further comprising optoelectronic devices respectively having optical wave input ports and output ports which are selectively linked via said first and second elementary photonic interconnect switches.

4. The photonic circuit according to claim 1, wherein which the optical waveguides and the rings of the redirecting photonic ring resonators are produced in one and the same plane.

5. The photonic circuit according to claim 1, wherein the second axes of symmetry for the first and second elementary photonic interconnect switches are aligned and pass through the intersections and the centers of the rings of the first and fourth simple switches.

* * * * *